United States Patent [19]

Yamaguchi

[11] Patent Number: 5,014,576

[45] Date of Patent: May 14, 1991

[54] LINE PRESSURE CONTROL DURING DOWNSHIFT

[75] Inventor: Hiroshi Yamaguchi, Yokohama, Japan

[73] Assignee: Nissan Motor Co., Ltd., Yokohama, Japan

[21] Appl. No.: 390,906

[22] Filed: Aug. 8, 1989

[30] Foreign Application Priority Data

Aug. 8, 1988 [JP] Japan .................. 63-196080

[51] Int. Cl.$^5$ ............... F16H 59/70; F16H 59/46
[52] U.S. Cl. ................................. 74/866; 74/867
[58] Field of Search ................. 74/867, 868, 866

[56] References Cited

U.S. PATENT DOCUMENTS

| | | | |
|---|---|---|---|
| 4,394,827 | 7/1983 | Kubo et al. | 74/867 X |
| 4,445,401 | 5/1984 | Ishimaru | 74/867 X |
| 4,627,312 | 12/1986 | Fujieda et al. | 74/866 |
| 4,771,658 | 9/1988 | Miyawaki | 74/866 |
| 4,790,217 | 12/1988 | Kamano et al. | 74/868 |
| 4,791,568 | 12/1988 | Hiromatsu et al. | 74/866 X |
| 4,796,490 | 1/1989 | Butts et al. | 74/866 |
| 4,949,595 | 8/1990 | Shimanaka | 74/867 X |
| 4,967,356 | 10/1990 | Mori | 74/866 X |

Primary Examiner—Allan D. Herrmann
Assistant Examiner—Khoi Q. Ta
Attorney, Agent, or Firm—Foley & Lardner

[57] ABSTRACT

According to the present invention, for a downshift operation, a line pressure is decreased at an initial stage of the downshift operation, a gear ratio is derived from an input revolution speed of an automatic transmission and an output revolution speed thereof, and the line pressure is increased when the gear ratio meets a predetermined condition.

10 Claims, 4 Drawing Sheets

LINE PRESSURE CONTROL DURING DOWNSHIFT

BACKGROUND OF THE INVENTION

The present invention relates to a line pressure control for an automatic transmission, and more particularly to a line pressure control when the automatic transmission undergoes a downshift operation.

An automatic transmission is shiftable between two gear positions by switching friction element or elements which are hydraulically activated by a hydraulic fluid pressure often called a line pressure.

During a downshift operation, a friction element on the high speed side is released to render the transmission operable in neutral state, allowing the engine to increase its revolution speed, and then another friction element on the low speed side is engaged. In order to shorten a period of time required for such a downshift operation, it is effective to decrease the magnitude of line pressure at an initial stage of the downshift operation so as to quickly release the friction element on the high speed side. However, if the timing when the line pressure is increased to the original level is retarded, the another friction element on the low speed side slips for a prolonged time. Thus, this measure of decreasing the line pressure at the initial stage of such downshift operation is difficult to be put into practice owing to the difficulty of managing the timing when the line pressure is increased to the original level.

An object of the present invention is to provide a line pressure control wherein the timing when the line pressure is increased to restore its original level is appropriately managed, so that the line pressure is allowed to be decreased sufficiently.

SUMMARY OF THE INVENTION

According to the present invention, for a downshift operation, a line pressure is decreased at an initial stage of the downshift operation, a gear ratio is derived from an input revolution speed of an automatic transmission and an output revolution speed thereof, and the line pressure is increased when the gear ratio meets a predetermined condition.

According to one aspect of the present invention, there is provided a line pressure control system for a drive system including an automatic transmission, the automatic transmission having an input shaft, an output shaft, and a plurality of friction elements which are adapted to be hydraulically activated by a line pressure, the automatic transmission being shiftable from one gear ratio down to another gear ratio by releasing a first one of the plurality of friction elements and then engaging a second one of the plurality of friction elements, the line pressure control system comprising:

input revolution speed sensor means for detecting a revolution speed of the input shaft and for generating an input revolution speed indicative signal;

output revolution speed sensor means for detecting a revolution speed of the output shaft for generating an output revolution speed indicative signal;

means for deriving a gear ratio from said input revolution speed indicative signal and said output revolution speed indicative signal and for generating a gear ratio indicative signal;

means for determining a target gear ratio predetermined for the another gear ratio and means for increasing the line pressure when said gear ratio indicative signal becomes greater than said target gear ratio.

According to another aspect of the present invention, there is provided a line pressure control method for a drive system including an automatic transmission, the transmission having an input shaft, an output shaft, and a plurality of friction elements which are adapted to be hydraulically activated by a line pressure, the automatic transmission being shiftable from one gear ratio down to another gear ratio by releasing a first one of the plurality of friction elements and then engaging a second one of the plurality of friction elements, the line pressure control method comprising the steps of:

detecting a revolution speed of the input shaft and generating an input revolution speed indicative signal;

detecting a revolution speed of the output shaft and generating an output revolution speed indicative signal;

deriving a gear ratio from said input revolution speed indicative signal and said output revolution speed indicative signal and generating a gear ratio indicative signal;

determining a target gear ratio predetermined for the another gear ratio and increasing the line pressure when said gear ratio indicative signal becomes greater than to said target gear ratio.

DETAILED DESCRIPTION OF THE INVENTION

Figure 1:
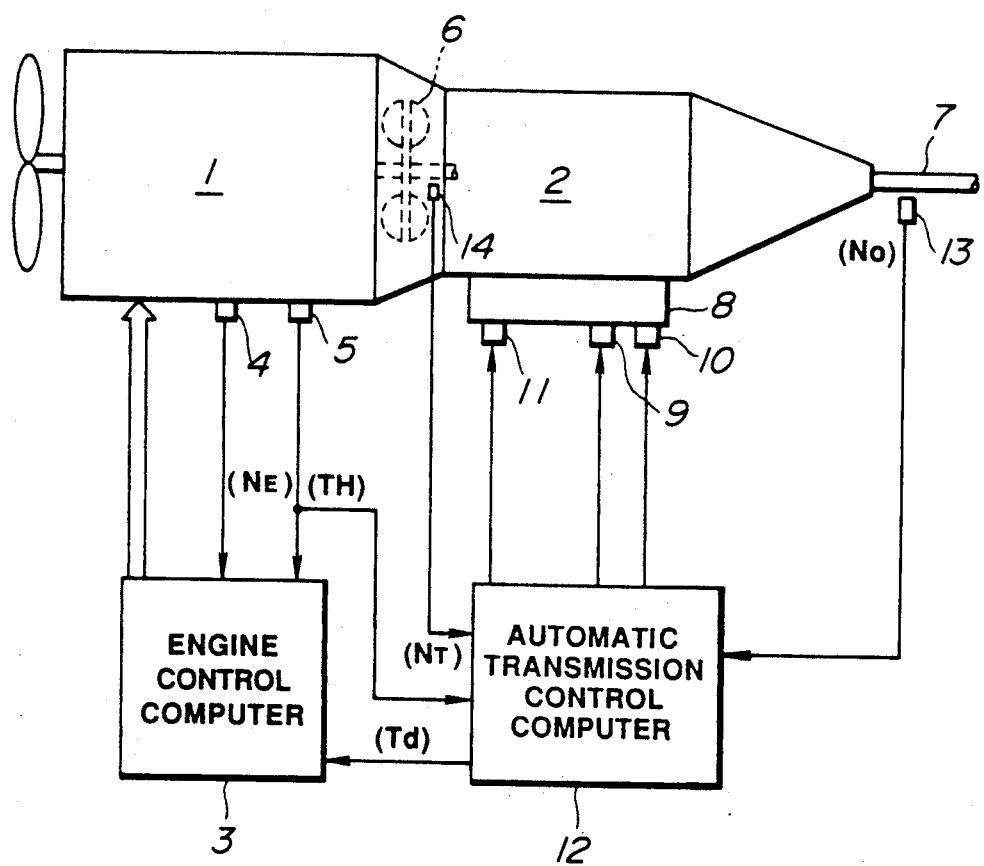
FIG. 1 is a block diagram showing one embodiment of a line pressure control according to the present invention.

Referring to FIG. 1, the line pressure control according to the present invention is described.

In FIG. 1. there is shown a drive system for an automotive vehicle. The drive system includes an internal combustion engine 1 serving as a prime mover, and an automatic transmission 2.

The engine 1 is operated under the control of an engine control computer 3 including in the usual manner a ROM, a RAM, a CPU, and an input/output control circuit, although not shown. The functions of the engine control computer are to determine ignition timing and an amount of fuel injection, and an the system thus includes engine revolution speed sensor 4 for detecting engine revolution speed $N_E$ and a throttle opening degree sensor 5 for detecting a throttle opening degree TH of the engine throttle valve. The sensor signals are supplied to the engine control computer 3.

The engine 1 is followed by a torque converter 6 which is in turn followed by the automatic transmission 2. This automatic transmission is of the RE4R01A type described in "NISSAN FULL-RANGE AUTOMATIC TRANSMISSION RE4R01A TYPE, SERVICE MANUAL, (A261C07)" issued on March, 1987 by NISSAN MOTOR COMPANY LIMITED. The automatic transmission of this type is also disclosed in U.S. Pat. No. 4,680,992 (Hayasaki et al.) which is hereby incorporated in its entirety by reference.

The automatic transmission 2 has a control valve assembly 8 including a first shift solenoid 9, a second shift solenoid 10, and a line pressure solenoid 11. The automatic transmission 2 is shiftable between four forward speeds or gear positions by selectively rendering ON/OFF the first and second shift solenoids 9 and 10 in accordance with a predetermined pattern as tabulated in the following Table 1.

TABLE 1

| Gear Position | Shift Solenoid | |
|---|---|---|
| | First Shift Solenoid 9 | Second Shift Solenoid 10 |
| First Speed | ON | ON |
| Second Speed | OFF | ON |
| Third Speed | OFF | OFF |
| Fourth Speed | ON | OFF |

ON/OFF control of the shift solenoids 9 and 10 and duty control of the line pressure solenoid 11 are carried out under the control of an automatic transmission control computer 12 which includes in the usual manner a ROM, a RAM, a CPU, and an input/output control circuit, although not shown. The sensor outputs of the engine revolution speed sensor 4 and throttle opening degree sensor 5 are supplied to the automatic transmission control computer 12. A transmission output revolution speed $N_O$ of a transmission output shaft 7 is detected by a transmission output shaft revolution speed sensor 13. A transmission input revolution speed $N_T$, namely a revolution speed of a turbine shaft of the torque converter 6, is detected by a transmission input revolution speed sensor 14. The output signals of the transmission output revolution speed sensor 13, transmission input revolution speed sensor 14 are also supplied to the automatic transmission control computer 12. The automatic transmission control computer 12 performs a shift control via selective operation of the shift solenoids 9 and 10, and a line pressure control via adjustment of duty of the line pressure solenoid 11. It also generates a torque-down signal $T_d$. This torque-down signal $T_d$ is supplied to the engine control computer 3, inducing a reduction in output torque of the engine 1 for reducing shift shock.

Figure 2:
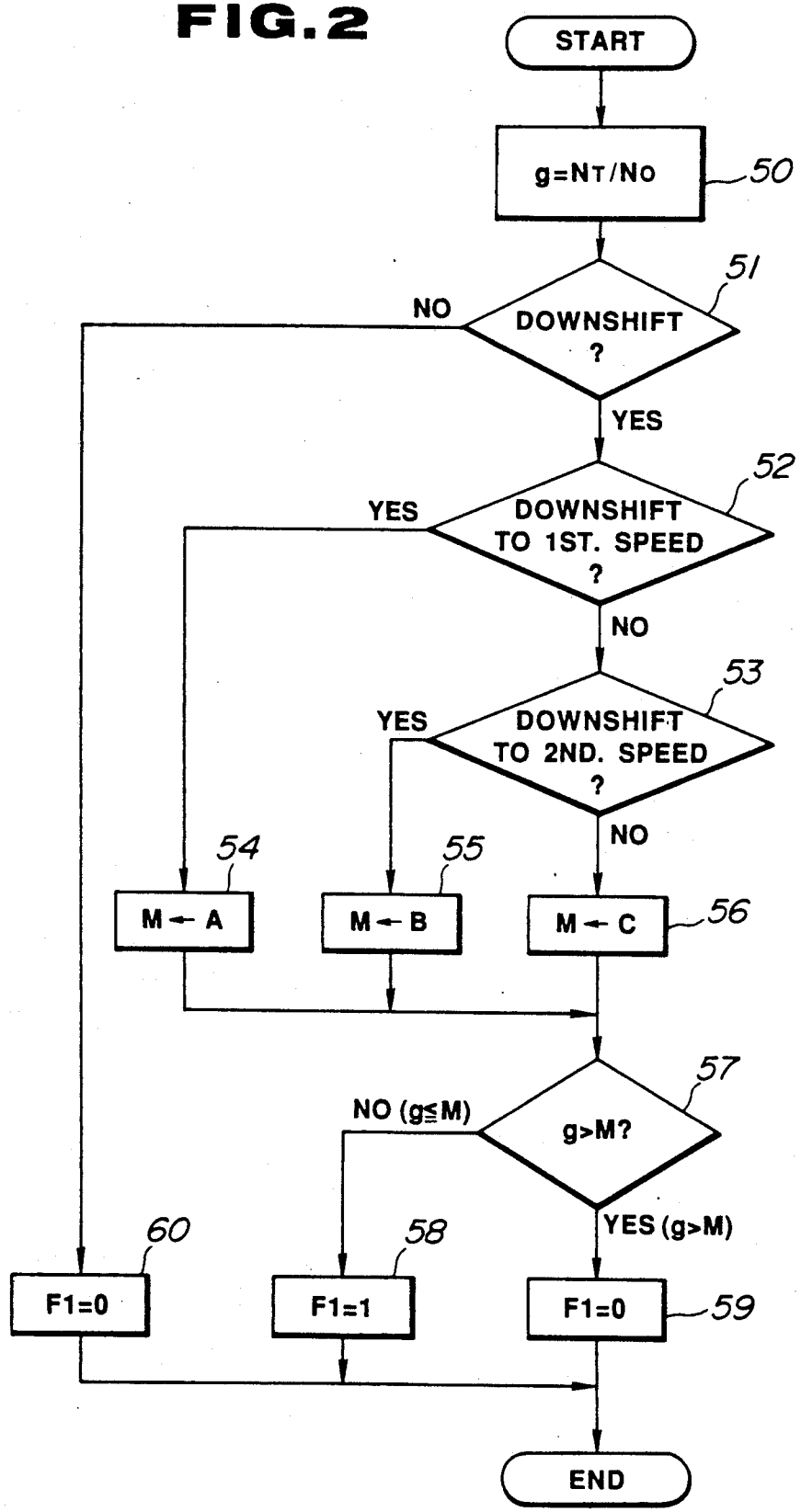
FIG. 2 is a flowchart of a program designed to set a flag F1 indicative of the fact that the automatic transmission undergoes a gear shift operation during a downshift operation by monitoring a gear ratio ($g = N_T/N_O$) during the downshift operation.
Figure 3:
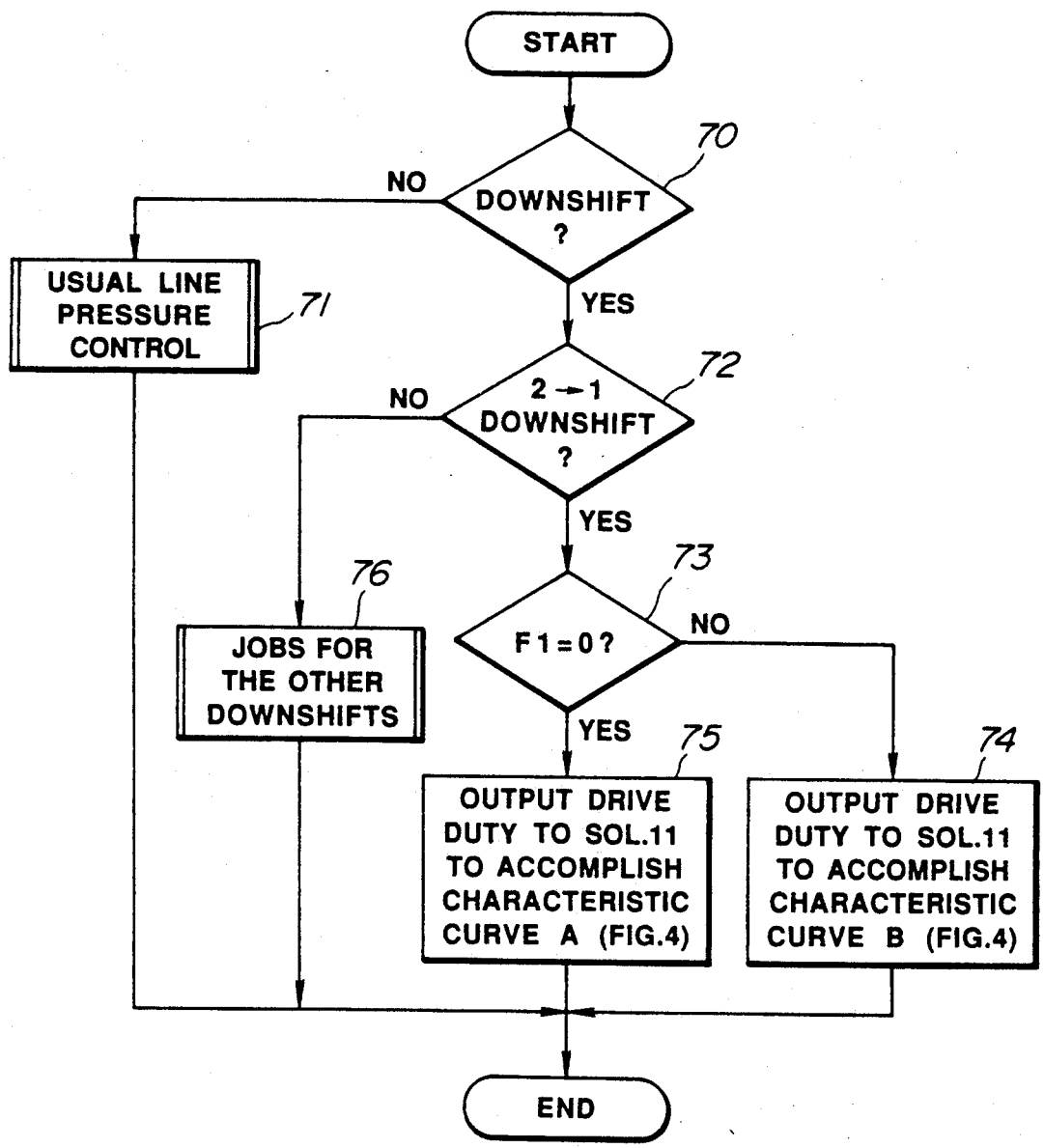
FIG. 3 is a flowchart of a program designed to increase the line pressure when the above-mentioned flag F1 is reset although the line pressure is decreased when the flag F1 is set.

Referring to FIGS. 2 and 3, the programs stored in the ROM of the automatic transmission control computer 12 are explained.

Referring to FIG. 2, the program designed to set a gear shift operation indicative flag F1 is explained.

In FIG. 2, at a step 50, a gear ratio g is derived by dividing the input revolution speed $N_T$ by the output revolution speed $N_O$ (viz., $g=N_T/N_O$). At a step 51, it is checked whether or not the downshift is desired or not. If yes, at steps 52 and 53, it is checked what kind of downshift is desired.

If a downshift to the first speed is desired, the program proceeds to a step 54 where a predetermined value A is set as a target gear ratio M. If a downshift to the second speed is desired, the program proceeds to a step 55 where a predetermined value B is set as the target gear ratio M. If a downshift to the other speed (the third, for example) is desired, the program proceeds to a step 56 where a predetermined value C is set as the target gear ratio M. These predetermined values A, B, and C are respectively set, in this embodiment, as values (A=2.9, B=1.4, C=0.6) which are somewhat smaller than the gear ratios (3.0, 1.5, and 0.7) for the first, second and third speeds, respectively, taking into account a control delay.

Next, at a step 57, the target gear ratio M is compared with the gear ratio g obtained at the step 50. That is, if a downshift from the third to the second speed or the fourth to the third speed is desired, the gear ratio g is compared with the predetermined value B or C. If $g \leq M$, that is, if the automatic transmission undergoes a gear shift operation, the program proceeds to a step 58 where the gear shift operation indicative flag F1 is set as 1. If $g > M$, that is, the gear shift operation for the downshift is completed, the program proceeds to a step 59 where the flag F1 is reset. If, at the step 51, no downshift is desired, the program proceeds to a step 60 whee the flag F1 is reset, since the line pressure control according to the invention is not required.

Referring to FIG. 3, the manner of adjusting the magnitude or level of the line pressure during a downshift is explained.

In FIG. 3, at a step 70, it is checked whether a downshift is desired or not. If it is not desired, the line pressure control according to the invention is not carried out. Hence, the program proceeds to a step 71 where the line pressure for normal non-shifting or an upshift is carried out.

If a downshift is desired, the program proceeds to a step 72 where it is checked what kind of downshift is desired. If a downshift from the second to the first speed is desired, the program proceeds to a step 73 where it is checked whether the flag F1 is zero or not.

Figure 4:
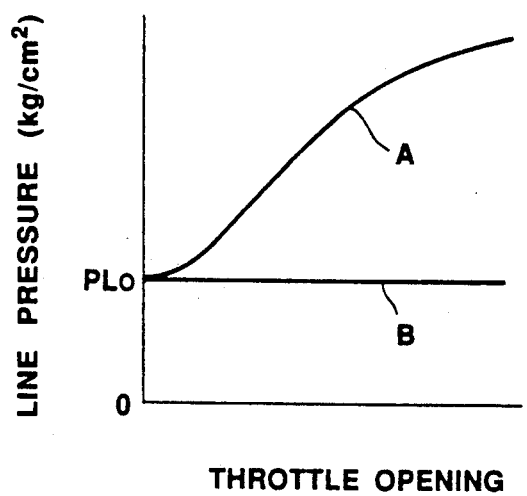
FIG. 4 is a chart illustrating two different line pressure characteristics used in the program in FIG. 3.

If F1=1 indicative of the fact that the automatic transmission undergoes a gear shift operation to effect the downshift from the second to the first speed, the program proceeds to a step 74 where the driving duty is output to the line pressure solenoid 11 in a manner to allow the line pressure to be adjusted to a value for a characteristic B shown in FIG. 4. The characteristic B serves to keep the line pressure to a minimum value $PL_0$ corresponding to the situation where the throttle valve is fully closed whatever the throttle opening degree the throttle valve actually keeps. By decreasing the line pressure during the gear shift operation, therefore, a shift response characteristic is improved.

On the other hand, if F1=0 indicative of the fact that the gear shift operation for the downshift from the second to the first speed is completed, the program proceeds to a step 75 where the driving duty is output to the line pressure solenoid 11 in a manner to allow the line pressure to be adjusted to a value for a characteristic A shown in FIG. 4. The characteristic A is similar to a characteristic employed in the normal line pressure control, in which the line pressure becomes higher as the throttle opening degree increases. In the above-mentioned manner, upon completion of the gear shift operation for the downshift, the line pressure increases quickly. Thus, no clutch slip nor breakage of the automatic transmission is induced.

Further, at the step 72, if the downshift from the second to first speed is not desired, that is, the downshift desired is from the third to second or the fourth to third speed, the program proceeds to a step 76. The step 76 is used for a subroutine for the downshift from the third to second or from the fourth to third speed like the foregoing steps 72 to 75. The subroutine comprises a subroutine for the downshift from the third to second speed corresponding to the step 72, which checks whether or not the fourth to third downshift is desired. As is now readily seen, at the step 72 to 75 and the step 76, the line pressure can be properly controlled with respect to the downshift from the second to first speed, from the third to second speed, or from the fourth to third speed.

What is claimed is:

1. A line pressure control system for a drive system including an automatic transmission, the automatic transmission having an input shaft, an output shaft, and a plurality of friction elements which are adapted to be hydraulically activated by a line pressure, the automatic transmission being shiftable from one gear ratio to another lower gear ratio by releasing a first one of the plurality of friction elements and then engaging a second one of the plurality of friction elements, the line pressure control system comprising:

input revolution speed sensor means for detecting a revolution speed of the input shaft and for generating an input revolution speed indicative signal;
  output revolution speed sensor means for detecting a revolution speed of the output shaft and for generating an output revolution speed indicative signal;
  means for deriving a gear ratio from said input revolution speed indicative signal and said output revolution speed indicative signal and for generating a gear ratio indicative signal;
  means for determining a target gear ratio predetermined for the another lower gear ratio; and
  means for increasing the line pressure when said gear ratio indicative signal becomes greater than said target gear ratio.

2. A line pressure control system as claimed in claim 1, wherein said gear ratio is derived by dividing the detected input revolution speed by the detected output revolution speed.

3. A line pressure control system as claimed in claim 2, wherein said target gear ratio is set smaller than a gear ratio to be established for the another speed.

4. A line pressure control system as claimed in claim 3, wherein the liner pressure is decreased when the automatic transmission is shifting from the one gear ratio to the another lower gear ratio until the line pressure is increased when said gear ratio becomes greater than said target gear ratio.

5. A line pressure control method for a drive system including an automatic transmission, the automatic transmission having an input shaft, an output shaft, and a plurality of friction elements which are adapted to be hydraulically activated by a line pressure, the automatic transmission being shiftable from one gear ratio to another lower gear ratio by releasing a first one of the plurality of friction elements and then engaging a second one of the plurality of friction elements, the line pressure control method comprising the steps:

detecting a revolution speed of the input shaft and generating an input revolution speed indicative signal;
  detecting a revolution speed of the output shaft and generating an output revolution speed indicative signal;
  deriving a gear ratio from said input revolution speed indicative signal and said output revolution speed indicative signal and generating a gear ratio indicative signal;
  determining a target gear ratio predetermined for the another gear ratio; and
  increasing the line pressure when said gear ratio indicative signal becomes greater than said target gear ratio.

6. In a drive system including an automatic transmission, the automatic transmission having an input shaft, an output shaft, and a plurality of friction elements which are hydraulically activated by a line pressure, the automatic transmission being shiftable from one gear ratio to another lower gear ratio by releasing a first one of the plurality of friction elements and then engaging a second one of the plurality of friction elements after a downshift command, a line pressure control method comprising the steps of:

detecting a revolution speed of the input shaft and generating an input revolution speed indicative signal;
  detecting a revolution speed of the output shaft and generating an output revolution speed indicative signal;
  deriving a gear ratio from said input revolution speed indicative signal and said output revolution speed indicative signal and generating a gear ratio indicative signal;
  decreasing the line pressure after the downshift command until said gear ratio indicative signal becomes greater than a target gear ratio that is lower than the another lower gear ratio; and
  increasing the line pressure after said gear ratio indicative signal becomes greater than said target gear ratio.

7. In a drive system including an automatic transmission, the automatic transmission having an input shaft, an output shaft, and a plurality of friction elements which are hydraulically activated by a line pressure, the automatic transmission being shiftable from one gear ratio to another lower gear ratio by releasing a first one of the plurality of friction elements and then engaging a second one of the plurality of friction elements after a downshift command, a line pressure control method comprising the steps of:

detecting a revolution speed of the input shaft and generating an input revolution speed indicative signal;
  detecting a revolution speed of the output shaft and generating an output revolution speed indicative signal;
  deriving a gear ration from said input revolution speed indicative signal and said output revolution speed indicative signal and generating a gear ratio indicative signal;
  adjusting the line pressure in accordance with a first predetermined line pressure characteristic prior to the downshift command;
  adjusting the line pressure in accordance with a second predetermined line pressure characteristic after the downshift command until said gear ratio indicative signal becomes greater than a target gear ratio that is lower than the another lower gear ratio; and
  adjusting the line pressure in accordance with said first predetermined line pressure characteristic after said gear ratio indicative signal becomes greater than said target gear ratio.

8. A line pressure control method as claimed in claim 7, wherein, under the same circumstances, said second line pressure characteristic provides a lower line pressure value than that of said first line pressure characteristic.

9. A line pressure control method as claimed in claim 8, wherein said lower line pressure valve is maintained at a constant minimum value corresponding to a position in which an engine throttle valve is fully closed.

10. A line pressure control system as claimed in claim 4, wherein the decreased line pressure is maintained at a constant minimum value corresponding to a position in which an engine throttle valve is fully closed.

* * * * *